(12) United States Patent
Lee et al.

(10) Patent No.: US 12,452,030 B2
(45) Date of Patent: Oct. 21, 2025

(54) CLOCK SYNCHRONIZATION BASED ON TEMPORAL PHOTON BUNCHING EFFECT

(71) Applicant: NATIONAL UNIVERSITY OF SINGAPORE, Singapore (SG)

(72) Inventors: Jianwei Lee, Singapore (SG); Lijiong Shen, Singapore (SG); Peng Kian Tan, Singapore (SG); Christian Kurtsiefer, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 266 days.

(21) Appl. No.: 18/547,259

(22) PCT Filed: Feb. 18, 2022

(86) PCT No.: PCT/SG2022/050074
§ 371 (c)(1),
(2) Date: Aug. 21, 2023

(87) PCT Pub. No.: WO2022/177507
PCT Pub. Date: Aug. 25, 2022

(65) Prior Publication Data
US 2024/0022391 A1    Jan. 18, 2024

(30) Foreign Application Priority Data
Feb. 22, 2021   (SG) .......................... 10202101741W

(51) Int. Cl.
*H04L 7/00*   (2006.01)
(52) U.S. Cl.
CPC .................... *H04L 7/0075* (2013.01)
(58) Field of Classification Search
CPC .................................................... H04L 7/0075
(Continued)

(56) References Cited

U.S. PATENT DOCUMENTS 7,286,444 B1 * 10/2007 Bahder ................... G04G 7/02
                                                          250/336.1
7,536,012 B1    5/2009 Meyers et al.
(Continued)

FOREIGN PATENT DOCUMENTS

CN          102955163 A         3/2013
CN          111526001 A         8/2020

OTHER PUBLICATIONS

Quan et al., "Demonstration of quantum synchronization based on second-order quantum coherence of entangled photons",<https://www.nature.com/articles/srep30453>, Scientific Reports 6, Jul. 25, 2016, Article No. 30453, (8 pages).
(Continued)

*Primary Examiner* — Dalzid E Singh
(74) *Attorney, Agent, or Firm* — Michael Best & Friedrich LLP

(57) ABSTRACT

A method of clock synchronization between first and second clocks on first and second ends, respectively, of an optical channel; and a system for clock synchronization between first and second clocks on first and second ends, respectively, of an optical channel. The method comprises the steps of generating light exhibiting thermal photon statistics, as opposed to a Poissonian timing statistic of coherent laser light; transmitting a portion of the light though the optical channel; determining timing information of single photon detection events of photons of the light at the first side of the optical channel using the first clock and at the second side of the optical channel using the second clock; using a temporal signature imprinted on the light as a result of the thermal photon statistics to identify temporal correlations between the single photon detection events at the first side of the optical channel and the single photon detection events at the second side of the optical channel; and determining an (Continued)

offset between the first and second clocks based on the identified temporal correlations.

20 Claims, 4 Drawing Sheets

(58) Field of Classification Search
USPC .......................................................... 398/154
See application file for complete search history.

(56) References Cited

U.S. PATENT DOCUMENTS

| | | | | |
|---|---|---|---|---|
| 7,684,015 | B2* | 3/2010 | Shih | G01S 19/23 |
| | | | | 250/340 |
| 9,270,385 | B2* | 2/2016 | Meyers | B82Y 10/00 |
| 9,331,843 | B2 | 5/2016 | Silverman et al. | |
| 11,251,952 | B2* | 2/2022 | Lamas-Linares | H04L 9/12 |
| 11,614,771 | B2* | 3/2023 | Vacon | G06F 1/14 |
| | | | | 713/400 |
| 2017/0317814 | A1 | 11/2017 | Grice et al. | |
| 2020/0084033 | A1 | 3/2020 | Lamas-linares et al. | |

OTHER PUBLICATIONS

Valencia et al., "Distant clock synchronization using entangled photon pairs", <https://aip.scitation.org/doi/10.1063/1.1797561.>, Applied Physics Letters 85, pp. 2655-2657, Sep. 28, 2004, (10 pages).

Quan et al., "High-precision nonlocal temporal correlation identification of entangled photon pairs for quantum clock synchronization", <https://www.researchgate.net/profile/Tao_Liu90/publication/334623774_Nonlocal_temporal_correlation_identification_of_entangled_photon_pairs_for_quantum_clock_synchronization/links/5e4211ad458515072d91a35a/Nonlocal-temporal-correlation-identification-of-entangled-photon-pairs-for-quantum-clock-synchronization.

Ho et al., "Clock synchronization by remote detection of correlated photon pairs", <https://iopscience.iop.org/article/10.1088/1367-2630/11/4/045011>, Apr. 30, 2009, Centre for Quantum Technologies, National University of Singapore, (14 pages).

Lamas-Linares et al., "Secure Quantum Clock Synchronization", <https://doi.org/10.1117/12.2290561.>, Feb. 22, 2018, Texas Advanced Computing Center, The University of Texas at Austin, Austin, Texas, (9 pages).

Brown, R. Hanbury; Twiss, R. Q. (1956): "Correlation between Photons in two Coherent Beams of Light", Nature. 177 (4497): 27-29. (1956).

Precision Time Protocol, IEEE Standards Association, IEEE Standard for a Precision Clock Synchronization Protocol for Networked Measurement and Control Systems, Accessed on Oct. 15, 2023 (PTP, IEEE 1588-2019).

Lee, Jianwei, et al. "Symmetrical clock synchronization with time-correlated photon pairs." Applied Physics Letters 114.10, Dec. 21, 2018, (5 pages).

Lee J. et al., "Absolute clock synchronization with a single time-correlated photon pair source over 10 km", arXiv: Quantum Physics, Sep. 9, 2020, pp. 1-5.

Tan P. K. et al., "Quantum sensing using thermal photon bunching" Quantum Communications and Quantum Imaging XIX, Aug. 1, 2021, vol. 11835, pp. 118350C.

Zhu J. et al., "A new clock synchronization scheme based on the second-order coherence of thermal light" Optica Applicata, Aug. 31, 2013, vol. 43, No. 2, pp. 373-381.

International Search report and Written Opinion for Application No. PCT/SG2022/050074 dated for Apr. 20, 2022, (10 pages).

* cited by examiner

27
CLOCK SYNCHRONIZATION BASED ON TEMPORAL PHOTON BUNCHING EFFECT

CROSS REFERENCE TO RELATED APPLICATIONS

This application is a national stage filing under 35 U.S.C. § 371 of International Patent Application No.: PCT/SG2022/050074, filed Feb. 18, 2022, which claims priority to Singapore Patent Application No. 10202101741 W, filed Feb. 22, 2021, the entire contents of all of which are hereby incorporated by reference herein.

FIELD OF INVENTION

The present invention relates broadly to clock synchronization based on temporal photon bunching effect, and in particular to a method and system of clock synchronization between first and second clocks on first and second ends, respectively of an optical channel.

BACKGROUND

Any mention and/or discussion of prior art throughout the specification should not be considered, in any way, as an admission that this prior art is well known or forms part of common general knowledge in the field.

Some existing clock synchronization protocols typically use information packets transmitted with conventional internet traffic, as a source for synchronization. However, the timing precision of NTP (<100 ms) and PTP (<100 ns) may not be satisfactory for certain applications.

Other existing protocols use counter-propagating signals between synchronizing clocks in such a way as to reduce as much as possible the influence of network delays on the synchronization result.

Another proposed protocol for clock synchronization uses generation of correlated photon pairs (i.e. using the correlation of the entangled signal-photon and idler-photon making up each pair) via spontaneous parametric down conversion (SPDC), which typically requires a non-linear crystal in the light source, with associated costs and additional points-of-failure Embodiments of the present invention seek to address at least one of the above problems.

SUMMARY

In accordance with a first aspect of the present invention, there is provided a method of clock synchronization between first and second clocks on first and second ends, respectively, of an optical channel, the method comprising the steps of:
generating light exhibiting thermal photon statistics, as opposed to a Poissonian timing statistic of coherent laser light;
transmitting a portion of the light through the optical channel;
determining timing information of single photon detection events of photons of the light at the first side of the optical channel using the first clock and at the second side of the optical channel using the second clock;
using a temporal signature imprinted on the light as a result of the thermal photon statistics to identify temporal correlations between the single photon detection events at the first side of the optical channel and the single photon detection events at the second side of the optical channel; and determining an offset between the first and second clocks based on the identified temporal correlations.

In accordance with a second aspect of the present invention, there is provided a system for clock synchronization between first and second clocks on first and second ends, respectively, of an optical channel, the system comprising:
a light source for generating light exhibiting thermal photon statistics, as opposed to a Poissonian timing statistic of coherent laser light;
a transmitter for transmitting a portion of the light through the optical channel; and
a processor for:
determining timing information of single photon detection events of photons of the light at the first side of the optical channel using the first clock and at the second side of the optical channel using the second clock;
using a temporal signature imprinted on the light as a result of the thermal photon statistics to identify temporal correlations between the single photon detection events at the first side of the optical channel and the single photon detection events at the second side of the optical channel; and
determining an offset between the first and second clocks based on the identified temporal correlations.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
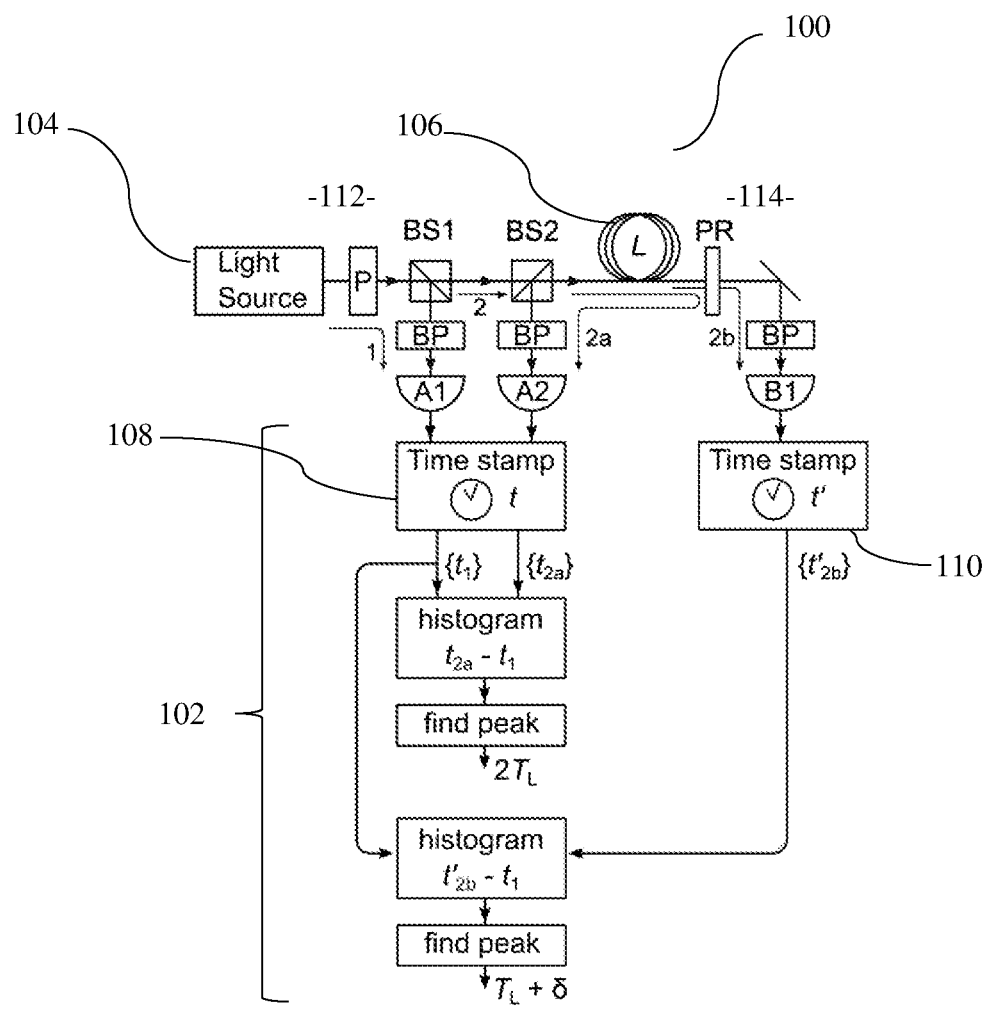
FIG. 1 shows a schematic drawing illustrating a clock synchronization system and method steps according to a first example embodiment using a single thermal or pseudo-thermal source.

Embodiments of the present invention exploit the quantum correlations in thermal or pseudo-thermal light, i.e., the photon bunching characteristics associated with such light, to perform clock synchronization between two spatially separated sites. Using two thermal or pseudo-thermal light sources, one for each clock to be synchronized, some embodiments of the present invention may discover the absolute clock offset independent of the physical separation between the clocks. In another example embodiment, one thermal or pseudo-thermal light source at one of the clocks can also discover the absolute clock offset between two clocks by means of routing some of the photons to sample the round-trip between the clocks.

The synchronization scheme according to example embodiments can be implemented with a single light source (see example embodiment 1 described in detail below), or with two light sources (see example embodiments 2 and 3 described in detail below) which achieves the same purpose but advantageously provides a stronger synchronization signal.

The light source(s) used in example embodiments exhibit thermal photon statistics, as opposed to a Poissonian timing statistic of coherent laser light. The light source(s) may comprise a laser source configured to generate the light below lasing threshold, super-luminescent diode, sub-threshold gas or solid state laser (including semiconductor laser), light emitting diode, arc lamp, incandescent light bulb, sunlight and starlight, blackbody radiator, mode-hopping lasers. The thermal photon statistics is used to imprint a temporal signature on the light field, which then is used to measure the single-trip time of a synchronization signal sent from one party to another. This information is useful for synchronizing two or more remote clocks. Using the temporal signature imprinted on the light as a result of the thermal photon statistics to identify temporal correlations in photon detection events for synchronization according to example embodiment advantageously allows the use of cheaper light sources compared to e.g. SPDC-based sources required in existing proposals.

In an example embodiment, this light is sent through a linear polarizer (P) and bandpass filters (BP) to increase its temporal photon bunching signature seen by detectors. Using P to filter the photons into the same polarization state increases the temporal photon bunching signature, since only photons in the same polarization state exhibit temporal bunching; photons in orthogonal polarization states are temporally uncorrelated to one another. All bandpass filters preferably have the same transmission wavelength, or alternatively, are replaced by a single bandpass filter right after the light source Both local and remote parties preferably detect photons using photodetectors with a high timing resolution, typically with a precision of 10-1000 ps. The detectors may comprise any light detector that is able to detect the arrival time of a single photon with a timing accuracy commensurate or higher than the coherence time of the photons. Examples for such photodetectors are photomultipliers, superconducting nanowire, and actively or passively quenched avalanche diode photon detectors.

Each synchronizing party preferably uses an electrical device to timestamp photodetection events from the single photon detectors. Each timestamp device is referenced to a local clock which is to be synchronized to the remote clock on this link.

Various algorithms are used in example embodiments to identify temporal photodetection correlations between various pairs of photodetectors. These algorithms aim to determine the statistical distribution of the detection time differences in a sufficiently large time window and with a sufficiently large time resolution. The detection time difference statistics is then used to find the time difference with the maximal number of detected photon pairs, corresponding to the photon bunching signature of the thermal or pseudo-thermal light field. These algorithms assume that the two clocks run with sufficiently similar frequencies such that a photon bunching peak can be observed. Should there be a significant frequency difference between the two clocks, the detection time differences are examined in time windows sufficiently small such that the frequency differences between clocks do not amount to an appreciable change in the offset between the clocks.

In the example embodiments described in detail below, the statistical distribution of the photodetection times registered at various detectors is constructed by first exchanging the timing information over a communication channel, and then calculating a histogram of the timing differences, as a non-limiting example.

Example Embodiment 1

FIG. 1 illustrates a clock synchronization system 100 and method steps 102 according to a first example embodiment using a single thermal or pseudo-thermal source 104. Timing correlations between detection events registered at detectors A1 and A2 can be used to derive the round trip time $2T_L$ of photons in the optical channel 106. Timing correlations between A1 and B1 can be used to determine the single trip time $T_L$, and the absolute offset $\delta$ between the clocks 108, 110 at the two parties or sides 112, 114 can be calculated from these two timing correlations. Polarizers (P) and bandpass filters (BP) help to increase this timing signature for the measurement process in this embodiment.

The light from light source 104 is sent through an optical component (e.g. a beam splitter, see FIG. 1, BS1), that splits the beam such that some photons (indicated at 1) are directed towards a reference single photon detector (FIG. 1, A1), while other photons (indicated at 2) are directed into the synchronization channel 106 (e.g. an optical telecommunication fibre or a free spacelink) to the remote party 114. There, a fraction of the photons (indicated at 2a) are reflected back to the originating party 112 from a partially reflecting element (FIG. 1, PR), and reach the original party after passing through the synchronization channel 106 in the reverse direction, where a certain fraction reaches a second single photon detector (FIG. 1, A2) through a beam splitter BS2. At the partially reflecting element (FIG. 1, PR), another fraction of the photons (indicated at 2b) reaches a single photon detector (FIG. 1, B1) of the remote party 114.

The difference between the detection times $t'_{2b}$ of photons (indicated at 2b) at the remote side 114 and local detection times $t_1$ corresponds to the original time difference between photons (indicated at 1) and (indicated at 2) from the light source 104, increased by the single trip time $T_L=L/v$ through the optical channel 106 and the absolute clock difference $\delta$ between the two reference clocks on both sides, where v is the speed of light in the optical channel 106. The position of the correlation peak identified by the algorithm is located at $T_{P1}=T_L+\delta$. The algorithm first histograms the detection time differences collected with a sufficiently high time resolution, and over a sufficiently large time duration. Next, it determines the centroid $T_{P1}$ of the distribution by fitting it to a function e.g. PseudoVoigt, Gaussian, that best describes the data. As another example, a computationally simple approach consists of assigning the maximum of the distribution to $T_{P1}$.

The timestamp information can be transmitted over a local-area network by means of a secure-shell protocol (SSH). However, the timing information can also be exchanged over other network architectures, or with other protocols. The protocol choice should preferably secure the communication channel through encryption and authentication. While the exchange of timing information via a communication channel is recommended for synchronization applications, especially in scenarios where real-time synchronization is preferred, it is noted that the exchange of timing information may be conducted differently, for example via transporting the timing information using physical storage devices.

The fraction (indicated at 2a) of the photons reflected back to the original party through the optical (synchronization) channel 106 is detected by photodetector A2 with time stamps $t_{2a}$. The time difference $t_{2a}$-$t_1$ corresponds to the original time difference of photons (indicated at 1) and (indicated at 2), increased by twice the round trip time $T_L$ through the optical channel 106. Therefore, the peak position of the correlation between detection time stamp sets $\{t_{2a}\}$ and $\{t_1\}$ determined using the above algorithm occurs at a position $T_{P2}=2T_L$.

The offset δ between the two spatially separate clocks for clock synchronization can then be obtained from the peak positions of the two steps described above via $\delta=T_{P1}-T_{P2}/2$.

Example Embodiment 2

Figure 2:
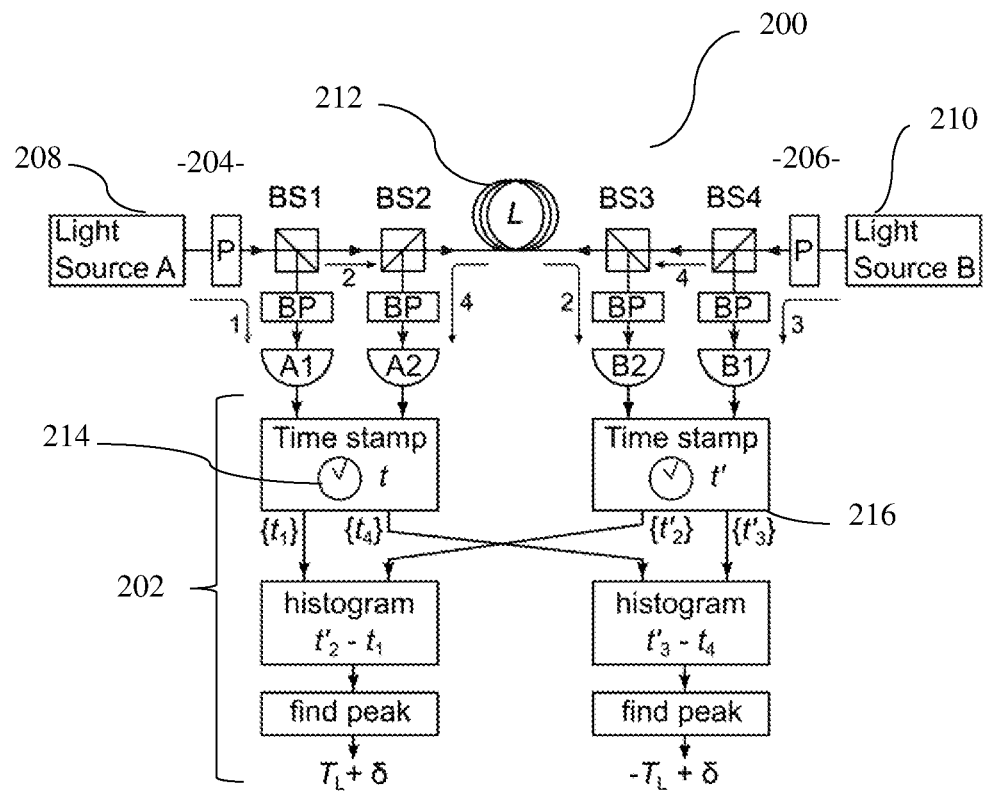
FIG. 2 shows a schematic drawing illustrating a symmetric clock synchronization system and method steps according to a second example embodiment.

FIG. 2 illustrates a symmetric clock synchronization system 200 and method steps 202 according to a second example embodiment. Both sides 204, 206 have a (pseudo-)thermal source 208, 210 of time-correlated photons with a temporal bunching signature. Light from each source 208, 210 is split using an optical component (BS1, BS4) so that some fraction of the photons (indicated at 1) and a fraction (indicated at 3) are detected locally with detectors A1 and B1 at the respective sides 204, 206, while the other fraction of photons (indicated at 2 and 4) is sent through an optical channel 212 of length L to be detected on the remote side by detectors A2 and B2. Polarizers (P) and bandpass filters (BP) help to increase the photon bunching signature in this embodiment. Detection time stamps of all detected photons are recorded at each side 204, 206 with respect to a local clock 214, 216, respectively. Timing analysis via histogramming detection time differences allows to infer the absolute clock offset δ between two clocks 214, 216 from the peak positions in this embodiment, as will now be described in detail.

The light from each thermal or pseudo-thermal light source 208, 210 is sent through the optical component (e.g. a beam splitter, see FIG. 2, BS1/BS4) that directs a fraction of the light (photons indicated at 1 and 3) to a local reference detector (A1 and B1 in FIG. 2), whereas the other fraction of the respective light is sent into the optical (synchronization) channel 212 (optical fiber or free space optical link as in embodiment 1) towards the other side, where a fraction of the photons (indicated at 2 and 4) reach to a detector (A2 and B2 in FIG. 2) for the remote photons.

The difference between the detection times $t'_2$ at detector B2 and detection times $t_1$ from detector A1 corresponds to the original time difference between photons (indicated at 1) and photons (indicated at 2) from light source A, increased by the sum of the propagation time $T_L=L/v$ through the optical channel 212 and the time difference δ between the two reference clocks 214, 216 on sides 204 and 206. A histogram of the difference of time stamp sets $\{t'_2\}$ and $\{t_1\}$ will therefore have the photon bunching peak position from thermal or pseudo-thermal light source 208 determined using the above described algorithm appear at a position $T_{PA}=T_L+\delta$.

Likewise, the difference between the detection times $t'_3$ at detector B1 and detection times $t_4$ from detector A2 corresponds to the original time difference between photons (indicated at 3) and photons (indicated at 4) from light source 210, decreased by the difference of the propagation time $T_L=L/v$ through the optical channel and increased by the time difference δ between the two reference clocks on sides 204 and 206. A histogram of the difference of time stamp sets $\{t'_3\}$ and $\{t_4\}$ will therefore have the photon bunching peak position from thermal or pseudo-thermal light source B appear at a position $T_{PB}=-T_L+\delta$.

The offset δ between the two spatially separated clocks 214, 216 for clock synchronization can be obtained via $\delta=(T_{PA}+T_{PB})/2$.

Example Embodiment 3

Figure 3:
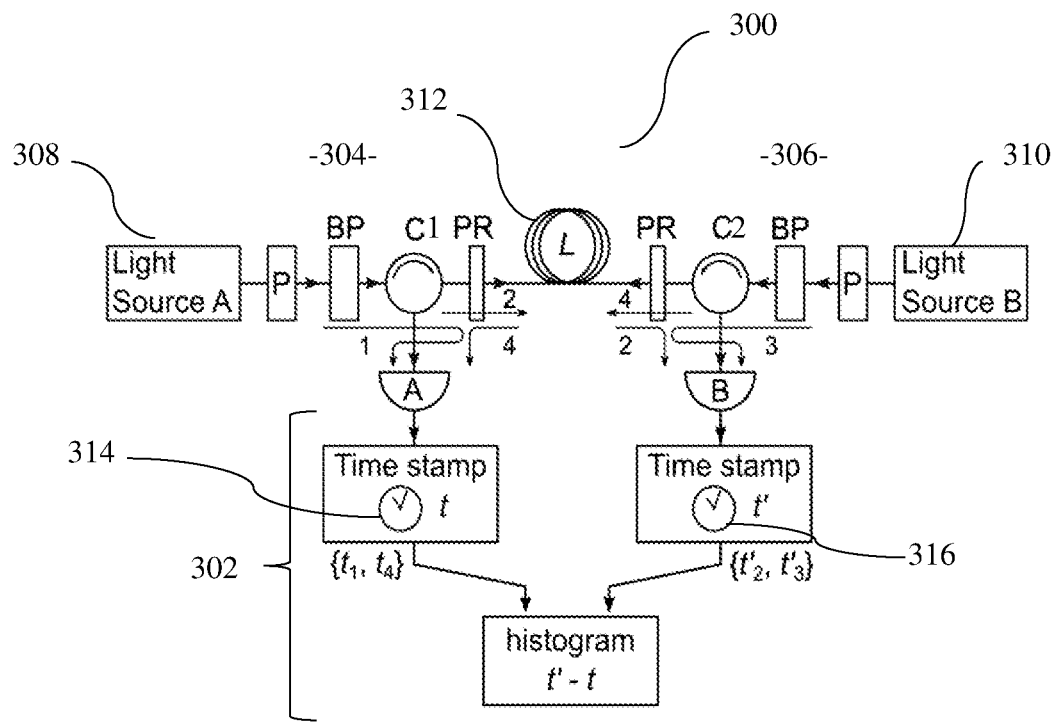
FIG. 3 shows a schematic drawing illustrating a symmetric clock synchronization system and method steps that require only one single photon detector on each side, according to a third embodiment.

FIG. 3 illustrates a symmetric clock synchronization system 300 and method steps 302 that require only one single photon detector (A, B) on each side 304, 306, according to a third example embodiment. The diversion of photons with a thermal or pseudo-thermal bunching signature from each light source 308, 310 is achieved using a partial reflecting element (PR), which reflects a fraction of the light (indicated at 1 and 3, respectively) to a local single photon detector (A or B, respectively) via optical circulators (C1, C2, respectively), while the other fraction (indicated at 2 and 4, respectively) is sent to the other side through the optical (synchronization) channel 312. The optical circulators (C2, C1, respectively) also preferably ensure that photons transmitted from the remote side 304, 306 (photons indicated at 2 and 4) and are directed to the respective local detector (B, A), noting that photons from the respective (pseudo)thermal light source (308, 310) (combined (1 and 2), and combined (3 and 4), respectively) are directed to the respective partial reflectors PR. The histogramming of time differences between combined detection events on each side reveals two peaks. Notably, in the configuration, shown here, the band bass filters (BP) on each side do not need to exactly match in their transmission frequency, as will now be described.

In this embodiment, the detection scheme can be simplified, while increasing the throughput at the expense of a complexity in processing timestamp data. As depicted in FIG. 3, each side has a thermal or pseudo-thermal light source 308, 310, and an optical circulator (C1 and C2 in FIG. 3), and a partial reflection element (PR in FIG. 3), which simply may be comprised by a fiber connection. This partial reflecting element PR directs a fraction of the light back to the local single photon detector (A or B in FIG. 3) via the respective circulator C1, C2, while the other fraction of the light is transmitted to the other side through the optical (synchronization) channel. At the respective other side, the optical circulator (C2, C1) directs the photon from the remote side to the single photon detector (B, A), where each detection event gets time stamped with respect to a local clock.

The combined detection time sets of photons from the local and the remote light source on each side get evaluated in a time difference histogram. This time difference histogram contains now pairings between photons that exhibit bunching due the thermal or pseudo-thermal nature of the light sources (i.e. $t_1$, $t'_2$ and $t_4$, $t'_3$), and uncorrelated photon pairings (i.e. $t_1$, $t'_3$ and $t_4$, $t'_2$) that form a background (see FIG. 4). Similar to embodiment 2, the photon bunching signatures of the two thermal or pseudo-thermal light sources appear at time differences t'-t of $\delta-T_L$ and $\delta+T_L$, respectively.

Figure 4:
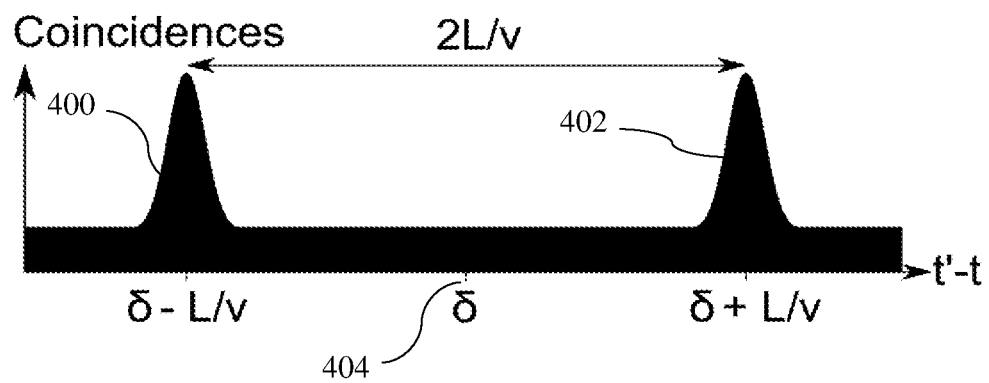
FIG. 4 shows a graph illustrating a coincidence histogram for photodetection time differences for a synchronization scheme of according to the third example embodiment.

FIG. 4 illustrates a coincidence histogram for photodetection time differences for a synchronization scheme of embodiment 3. Each peak 400, 402 corresponds to time correlated thermal or pseudo-thermal photons emitted by each source 308, 310 (see FIG. 3). The time separation of the peaks 400, 402 corresponds to the round-trip time $2T_L=2L/v$, where v is the speed of light in the optical (synchronization) channel 312 (see FIG. 3). The midpoint 404 is the absolute offset δ between the clocks 314, 316 (see FIG. 3).

In a measurement to demonstrate the presence of a thermal or pseudo-thermal photocorrelation peak according to an example embodiment, a histogram was recorded for detection events in a prototype setup corresponding to embodiment 1 between detectors A1 and B1. The photodetectors used were superconducting nanowire devices with a timing uncertainty below 50 ps full width at half maximum (FWHM). The distance between the clocks was L=1 km.

Figure 5:
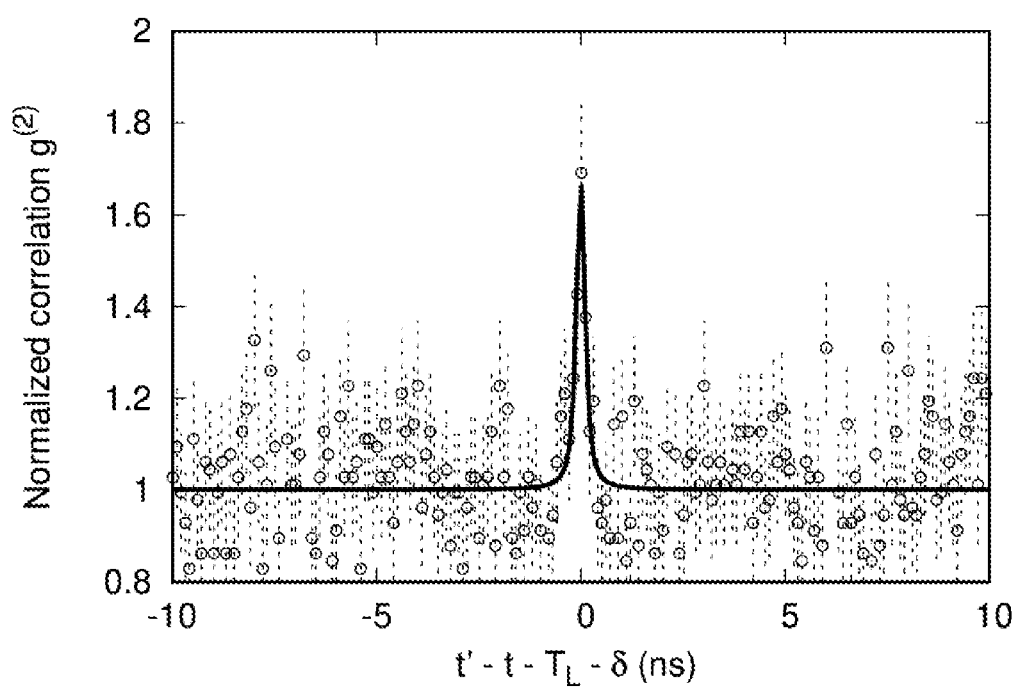
FIG. 5 shows a graph of the measured coincidence histogram $t'_{2B}-t_1$ from detection times at detectors A1 and B1 according to the first example embodiment.

FIG. 5 shows the measured coincidence histogram $t'_{2B}-t_1$ from detection times at A1 and B1 as described for embodiment 1. The histogram (black circles) exhibits a peak centered at $T_{P1}=T_L+\delta$, with a full-width at half-maximum (FWHM) of 0.3 ns, which is significantly longer than the timing precision of the photodetectors, and reflects the coherence time of the thermal or pseudo-thermal light field of a sub-threshold laser diode. Solid line: Least-squares fit of the histogram to a Voigt distribution. The fit returns the peak position. Error bars: Poissonian error.

In the prototype measurement, the photon bunching signature peak was observed with a statistical significance of about 4 standard deviations within an integration time of 20 minutes. This integration time is expected to reduce to a few seconds using a timestamp unit instead of an oscilloscope used for this acquisition. An additional peak (not shown), which can be obtained by histogramming $t'_{2A}-t_1$ using the detection times at A1 and A2, is expected to be centered at $T_{P2}=2T_L$ with a similar FWHM. The precision of extracting $T_{P1}$ and $T_{P2}$ affects the synchronization precision—sub-nanosecond values of FWHM obtained with the example embodiment allows greater synchronization precision compared to existing protocols. For the histogram in FIG. 5, the peak position would be extracted with an uncertainty of 27 ps.

Embodiments of the present invention can offer clock synchronization with the temporal correlation of light with a thermal or pseudo-thermal photon statistics used at the physical layer of a network connection. The temporal correlation is intrinsic to thermal or pseudo-thermal light, and are even found in stationary (i.e., unmodulated) light. This allows a clock synchronization device to be vastly simplified since comparable capabilities are typically obtained by using a modulated light source, and a separate (pseudo-)random number generator. This advantageously results in a much cheaper device, as no modulation hardware is required. Example embodiments of the present invention exploit (pseudo-) thermal photon bunching to provide the quantum correlations whereby time-of-flight information is extracted to determine distance. This advantageously provides crosstalk rejection: The quantum correlations cannot be reproduced by a third-party and injected into the system according to example embodiments, whether by accident or intent, even if the third-party system is identical in design. This enhances the security of a clock synchronization technique significantly As embodiments of the present invention rely on only a relatively small spectral window for detection, it does not take up appreciable bandwidth and can be implemented alongside existing telecommunications infrastructure without interfering with their normal function. This contrasts with existing time synchronization protocols that take up bandwidth using conventional data packets. It may even be integrated with existing optical modulation and detection techniques, as long as thermal or pseudo-thermal light properties are used in a local transmitter for at least a fraction of the time e.g., during the "on" or "off" phase in an intensity-modulated optical carrier.

Figure 6:
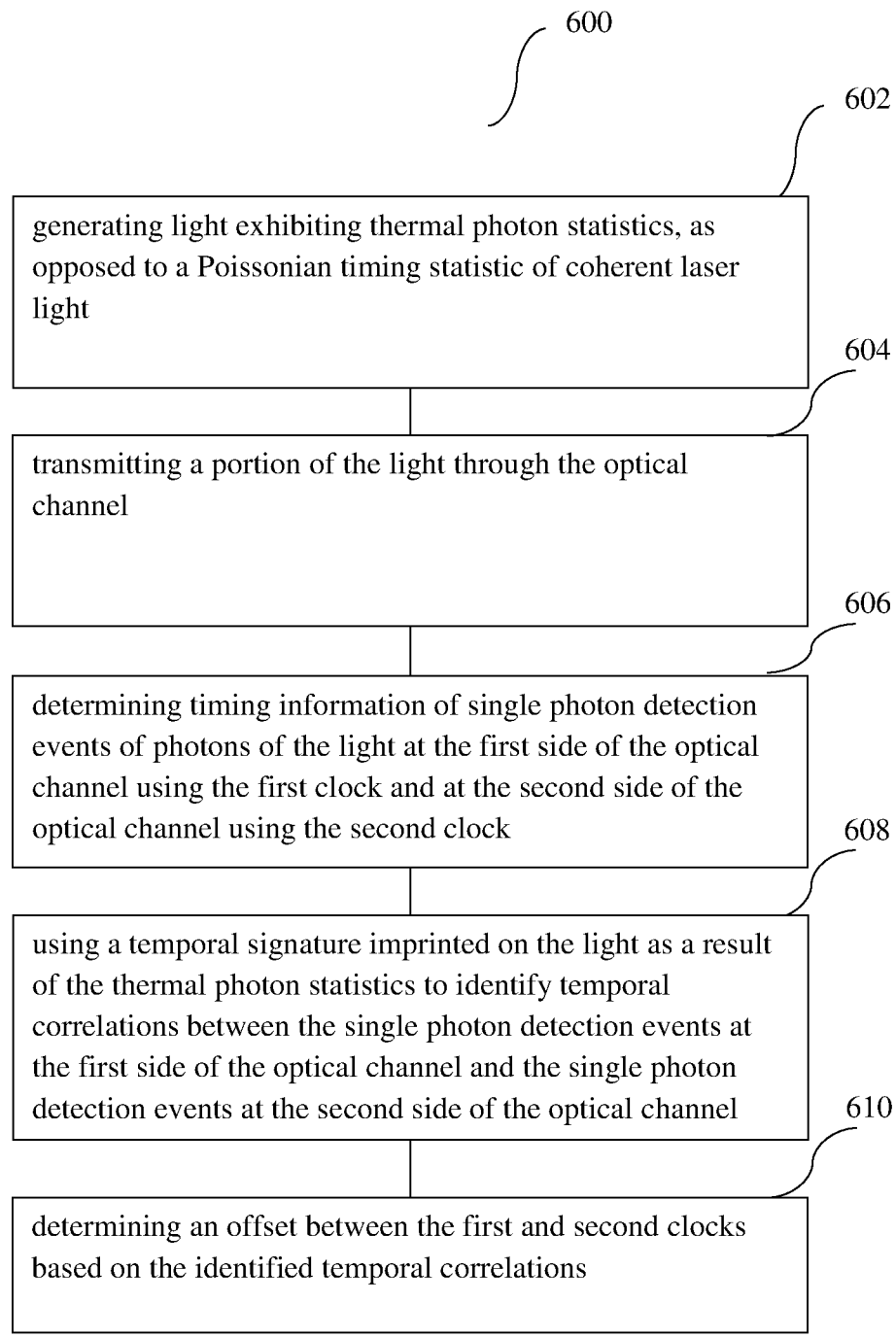
FIG. 6 shows a flowchart illustrating a method of clock synchronization between first and second clocks on first and second ends, respectively, of an optical channel, according to an example embodiment.

FIG. 6 shows a flowchart 600 illustrating a method of clock synchronization between first and second clocks on first and second ends, respectively, of an optical channel, according to an example embodiment. At step 602, light exhibiting thermal photon statistics, as opposed to a Poissonian timing statistic of coherent laser light is generated. At step 604, a portion of the light is transmitted through the optical channel. At step 606, timing information of single photon detection events of photons of the light at the first side of the optical channel using the first clock and at the second side of the optical channel using the second clock is determined. At step 608, a temporal signature imprinted on the light as a result of the thermal photon statistics is used to identify temporal correlations between the single photon detection events at the first side of the optical channel and the single photon detection events at the second side of the optical channel. At step 610, an offset between the first and second clocks is determined based on the identified temporal correlations.

The method may comprise polarizing the light to increase photon bunching in the light for increasing the temporal signature.

The method may comprise bandpass filtering to increase photon bunching in the light for increasing the temporal signature.

Generating the light may comprise using a light source disposed on the first side of the optical channel. Determining the timing information of single photon detection events at the first side of the optical channel may comprise using a first detector configured for detecting photons of a first portion of the light not having been transmitted through the optical channel; and using a second detector configured for detecting photons of a second portion of the light having been transmitted twice through the optical channel; wherein determining the timing information of single photon detection events at the second side of the optical channel comprises using a third detector configured for detecting photons of a third portion of the light, the third portion of the light having been transmitted once through the optical channel. Identifying the temporal correlations may comprise generating a first histogram of the time differences between the single photon detection events in the first and second detectors; and generating a second histogram of the time differences between the single photon detection events in the first and third detectors. Determining the offset between the first and second clocks may comprise identifying first and second peaks in the first and second histograms, respectively.

Generating the light may comprise using the first light source disposed on the first side of the optical channel and using a second light source disposed on the second side of the optical channel. Determining the timing information of single photon detection events at the first side of the optical channel may comprise using a first detector configured for detecting photons of a first portion of the light generated using the first light source not having been transmitted through the optical channel; and using a second detector configured for detecting photons of a first portion of the light generated using the second light source having been transmitted once through the optical channel; wherein determining the timing information of single photon detection events at the second side of the optical channel may comprise using a third detector configured for detecting photons of a second portion of the light generated using the first light source having been transmitted once through the optical channel;

and using a fourth detector configured for detecting photons of a second portion of the light generated using the second light source not having been transmitted through the optical channel. Identifying the temporal correlations may comprise generating a first histogram of the time differences between the single photon detection events in the first and third detectors; and generating a second histogram of the time differences between the single photon detection events in the second and fourth detectors. Determining the offset between the first and second clocks may comprise identifying first and second peaks in the first and second histograms, respectively.

Determining the timing information of single photon detection events at the first side of the optical channel may comprise using a first detector configured for detecting photons of a first portion of the light generated using the first light source not having been transmitted through the optical channel and for detecting photons of a first portion of the light generated using the second light source having been transmitted once through the optical channel; and wherein determining the timing information of single photon detection events at the second side of the optical channel may comprise using a second detector configured for detecting photons of a second portion of the light generated using the first light source having been transmitted once through the optical channel and for detecting photons of a second portion of the light generated using the second light source not having been transmitted through the optical channel. Identifying the temporal correlations may comprise generating a histogram of the time differences between sets of the single photon detection events in the first and second detectors. Determining the offset between the first and second clocks may comprise identifying a midpoint between first and second peaks in the histogram.

In one embodiment, a system for clock synchronization between first and second clocks on first and second ends, respectively, of an optical channel is provided, the system comprising a light source for generating light exhibiting thermal photon statistics, as opposed to a Poissonian timing statistic of coherent laser light; a transmitter for transmitting a portion of the light through the optical channel; and a processor for determining timing information of single photon detection events of photons of the light at the first side of the optical channel using the first clock and at the second side of the optical channel using the second clock; using a temporal signature imprinted on the light as a result of the thermal photon statistics to identify temporal correlations between the single photon detection events at the first side of the optical channel and the single photon detection events at the second side of the optical channel; and determining an offset between the first and second clocks based on the identified temporal correlations.

The system may comprise a polarizer for polarizing the light to increase photon bunching in the light for increasing the temporal signature.

The system may comprise a filter for bandpass filtering to increase photon bunching in the light for increasing the temporal signature.

The light source may be disposed on the first side of the optical channel. The system may comprise a first detector configured for detecting photons of a first portion of the light not having been transmitted through the optical channel; and a second detector configured for detecting photons of a second portion of the light having been transmitted twice through the optical channel; and a third detector configured for detecting photons of a third portion of the light, the third portion of the light having been transmitted once through the optical channel. The processor, for identifying the temporal correlations, may be configured for generating a first histogram of the time differences between the single photon detection events in the first and second detectors; and for generating a second histogram of the time differences between the single photon detection events in the first and third detectors. The processor, for determining the offset between the first and second clocks, may be configured for identifying first and second peaks in the first and second histograms, respectively.

The system may comprise the first light source disposed on the first side of the optical channel and a second light source disposed on the second side of the optical channel. The system may comprise a first detector configured for detecting photons of a first portion of the light generated using the first light source not having been transmitted through the optical channel; a second detector configured for detecting photons of a first portion of the light generated using the second light source having been transmitted once through the optical channel; a third detector configured for detecting photons of a second portion of the light generated using the first light source having been transmitted once through the optical channel; and a fourth detector configured for detecting photons of a second portion of the light generated using the second light source not having been transmitted through the optical channel. The processor, for identifying the temporal correlations, may be configured for generating a first histogram of the time differences between the single photon detection events in the first and third detectors; and generating a second histogram of the time differences between the single photon detection events in the second and fourth detectors. The processor, for determining the offset between the first and second clocks, may be configured for identifying first and second peaks in the first and second histograms, respectively. The system may comprise a first detector configured for detecting photons of a first portion of the light generated using the first light source not having been transmitted through the optical channel and for detecting photons of a first portion of the light generated using the second light source having been transmitted once through the optical channel; and a second detector configured for detecting photons of a second portion of the light generated using the first light source having been transmitted once through the optical channel and for detecting photons of a second portion of the light generated using the second light source not having been transmitted through the optical channel. The processor, for identifying the temporal correlations, may be configured for generating a histogram of the time differences between sets of the single photon detection events in the first and second detectors. The processor, for determining the offset between the first and second clocks, may be configured for identifying a midpoint between first and second peaks in the histogram.

The light source(s) may comprise a laser source configured to generate the light below lasing threshold, a superluminescent diode, a sub-threshold gas or solid state laser (including semiconductor laser), a light emitting diode, an arc lamp, an incandescent light bulb, Sunlight and starlight, a blackbody radiator, or a mode-hopping laser.

The detectors may comprise any light detector that is able to detect the arrival time of a single photon with a timing accuracy commensurate or higher than the coherence time of the photons. The detectors may comprise photomultipliers, superconducting nanowire or transition edge detectors, and/or or actively or passively quenched avalanche diode photon detectors.

Preferred embodiments of the present invention can have one or more of the following features and associated benefits/advantages:

| Feature | Benefit/Advantage |
| --- | --- |
| Uses a standard laser system for a light source, operating below lasing threshold | Simplicity of implementation: Compared to other narrow-band thermal or pseudo-thermal light sources based on lasers followed by a phase randomization element, e.g. a moving diffuser like a rotating ground glass plate, the technique according to example embodiments does not require such optical elements, while maintaining a much higher spectral brightness than spectral lines emitted e.g. in the glow of low-pressure gas discharge lamps.<br>High photon flux: Compared to the use of time-correlated photon pairs for clock synchronization as a light source, the light source based on a sub-threshold laser according to example embodiments is capable of generating a much higher photon flux, enabling synchronization over longer distances, or in shorter time for a desired precision. |
| Narrowband spectral filtering | Signal-to-noise ratio: The technique according to example embodiments increases the coherence time of the photons generated by (pseudo-) thermal light sources so that it is commensurate or larger than the timing precision of the light detectors. This advantageously improves the photon bunching signature that is used to establish the clock synchronization.<br>The narrow optical bandwidth also reduces dispersion in fibres to a negligible level, advantageously resulting in both a higher signal-to-noise ratio signal, and also a more precise clock synchronization. |

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

We claim:

1. A method of clock synchronization between first and second clocks on first and second ends, respectively, of an optical channel, the method comprising the steps of:
   generating light exhibiting thermal photon statistics, as opposed to a Poissonian timing statistic of coherent laser light;
   transmitting a portion of the light through the optical channel;
   determining timing information of single photon detection events of photons of the light at the first side of the optical channel using the first clock and at the second side of the optical channel using the second clock;
   using a temporal signature imprinted on the light as a result of the thermal photon statistics to identify temporal correlations between the single photon detection events at the first side of the optical channel and the single photon detection events at the second side of the optical channel; and
   determining an offset between the first and second clocks based on the identified temporal correlations.

2. The method of claim 1, comprising polarizing the light to increase photon bunching in the light for increasing the temporal signature.

3. The method of claim 1, comprising bandpass filtering to increase photon bunching in the light for increasing the temporal signature.

4. The method of claim 1, wherein generating the light comprises using a light source disposed on the first side of the optical channel, and optionally
   wherein determining the timing information of single photon detection events at the first side of the optical channel comprises:
      using a first detector configured for detecting photons of a first portion of the light not having been transmitted through the optical channel; and
      using a second detector configured for detecting photons of a second portion of the light having been transmitted twice through the optical channel;
   wherein determining the timing information of single photon detection events at the second side of the optical channel comprises using a third detector configured for detecting photons of a third portion of the light, the third portion of the light having been transmitted once through the optical channel.

5. The method of claim 4, wherein identifying the temporal correlations comprises generating a first histogram of the time differences between the single photon detection events in the first and second detectors; and generating a second histogram of the time differences between the single photon detection events in the first and third detectors, and optionally wherein determining the offset between the first and second clocks comprises identifying first and second peaks in the first and second histograms, respectively.

6. The method of claim 4, wherein generating the light comprises using the first light source disposed on the first side of the optical channel and using a second light source disposed on the second side of the optical channel, and optionally
   wherein determining the timing information of single photon detection events at the first side of the optical channel comprises:
      using a first detector configured for detecting photons of a first portion of the light generated using the first light source not having been transmitted through the optical channel; and
      using a second detector configured for detecting photons of a first portion of the light generated using the second light source having been transmitted once through the optical channel;
   wherein determining the timing information of single photon detection events at the second side of the optical channel comprises:
      using a third detector configured for detecting photons of a second portion of the light generated using the first light source having been transmitted once through the optical channel; and
      using a fourth detector configured for detecting photons of a second portion of the light generated using the second light source not having been transmitted through the optical channel.

7. The method of claim 6, wherein identifying the temporal correlations comprises generating a first histogram of the time differences between the single photon detection events in the first and third detectors; and generating a second histogram of the time differences between the single photon detection events in the second and fourth detectors, and optionally wherein determining the offset between the first and second clocks comprises identifying first and second peaks in the first and second histograms, respectively.

8. The method of claim 6, wherein determining the timing information of single photon detection events at the first side of the optical channel comprises:
   using a first detector configured for detecting photons of a first portion of the light generated using the first light source not having been transmitted through the optical channel and for detecting photons of a first portion of the light generated using the second light source having been transmitted once through the optical channel;
and wherein determining the timing information of single photon detection events at the second side of the optical channel comprises:
   using a second detector configured for detecting photons of a second portion of the light generated using the first light source having been transmitted once through the optical channel and for detecting photons of a second portion of the light generated using the second light source not having been transmitted through the optical channel.

9. The method of claim 8, wherein identifying the temporal correlations comprises generating a histogram of the time differences between sets of the single photon detection events in the first and second detectors, and optionally wherein determining the offset between the first and second clocks comprises identifying a midpoint between first and second peaks in the histogram.

10. A system for clock synchronization between first and second clocks on first and second ends, respectively, of an optical channel, the system comprising:
   a light source for generating light exhibiting thermal photon statistics, as opposed to a Poissonian timing statistic of coherent laser light;
   a transmitter for transmitting a portion of the light through the optical channel; and
   a processor for:
      determining timing information of single photon detection events of photons of the light at the first side of the optical channel using the first clock and at the second side of the optical channel using the second clock;

using a temporal signature imprinted on the light as a result of the thermal photon statistics to identify temporal correlations between the single photon detection events at the first side of the optical channel and the single photon detection events at the second side of the optical channel; and determining an offset between the first and second clocks based on the identified temporal correlations.

11. The system of claim 10, comprising a polarizer for polarizing the light to increase photon bunching in the light for increasing the temporal signature.

12. The system of 10, comprising a filter for bandpass filtering to increase photon bunching in the light for increasing the temporal signature.

13. The system of claim 10, wherein the light source is disposed on the first side of the optical channel, and optionally comprising:
a first detector configured for detecting photons of a first portion of the light not having been transmitted through the optical channel; and a second detector configured for detecting photons of a second portion of the light having been transmitted twice through the optical channel; and
a third detector configured for detecting photons of a third portion of the light, the third portion of the light having been transmitted once through the optical channel.

14. The system of claim 13, wherein the processor, for identifying the temporal correlations, is configured for generating a first histogram of the time differences between the single photon detection events in the first and second detectors; and for generating a second histogram of the time differences between the single photon detection events in the first and third detectors.

15. The system of claim 14, wherein the processor, for determining the offset between the first and second clocks, is configured for identifying first and second peaks in the first and second histograms, respectively.

16. The system of claim 13, comprising the first light source disposed on the first side of the optical channel and a second light source disposed on the second side of the optical channel, and optionally comprising:
a first detector configured for detecting photons of a first portion of the light generated using the first light source not having been transmitted through the optical channel;
a second detector configured for detecting photons of a first portion of the light generated using the second light source having been transmitted once through the optical channel;
a third detector configured for detecting photons of a second portion of the light generated using the first light source having been transmitted once through the optical channel; and
a fourth detector configured for detecting photons of a second portion of the light generated using the second light source not having been transmitted through the optical channel.

17. The system of claim 16, comprising:
a first detector configured for detecting photons of a first portion of the light generated using the first light source not having been transmitted through the optical channel and for detecting photons of a first portion of the light generated using the second light source having been transmitted once through the optical channel; and
a second detector configured for detecting photons of a second portion of the light generated using the first light source having been transmitted once through the optical channel and for detecting photons of a second portion of the light generated using the second light source not having been transmitted through the optical channel.

18. The system of claim 17, wherein the processor, for identifying the temporal correlations, is configured for generating a histogram of the time differences between sets of the single photon detection events in the first and second detectors.

19. The system of claim 18, wherein the processor, for determining the offset between the first and second clocks, is configured for identifying a midpoint between first and second peaks in the histogram.

20. The system of claim 10, wherein the processor, for identifying the temporal correlations, is configured for generating a first histogram of the time differences between the single photon detection events in the first and third detectors; and generating a second histogram of the time differences between the single photon detection events in the second and fourth detectors, and optionally wherein the processor, for determining the offset between the first and second clocks, is configured for identifying first and second peaks in the first and second histograms, respectively.

* * * * *